United States Patent [19]

Jakobe

[11] 4,084,139
[45] Apr. 11, 1978

[54] SHOULDER SUPPORTED STEREOPHONIC RADIO RECEIVER

[76] Inventor: Eugene J. Jakobe, 9905 Holly, Kansas City, Mo. 64114

[21] Appl. No.: 790,699

[22] Filed: Apr. 25, 1977

[51] Int. Cl.² .................................................. H04B 1/08
[52] U.S. Cl. ................................. 325/361; 325/310; 325/16; 325/66
[58] Field of Search ...................... 325/361, 16, 15, 66, 325/102, 111, 118, 116, 310; 343/113 PT

[56] References Cited

U.S. PATENT DOCUMENTS

| 2,541,042 | 2/1951 | Curtis | 325/361 |
| 2,571,514 | 10/1951 | Andrews | 325/361 |
| 3,114,105 | 12/1963 | Neumiller | 325/361 |

Primary Examiner—Robert L. Griffin
Assistant Examiner—Tommy P. Chin
Attorney, Agent, or Firm—Schmidt, Johnson, Hovey & Williams

[57] ABSTRACT

A portable radio receiver including a pair of loudspeakers for reproducing stereo signal sources is provided with a unitary, generally U-shaped, substantially rigid, component enclosing and supporting structure adapted to be carried on the shoulders of a user thereof, with one speaker disposed on each shoulder adjacent to and directed toward the corresponding ear of the user, whereby to provide the user with stereophonic sound reception even during movement from place to place. The structure includes a pair of spaced apart hollow enclosure sections, each having a lower contoured surface suitable for resting naturally upon the respective shoulders of the user, interconnected by a tubular element extending around the rear of the user's neck. Although a frontal strap may optionally be employed, the contouring of the shoulder-engaging sections with the aid of the neck-engageable element when needed, are normally sufficient to assure the receiver remaining in place during ordinary physical activity. The hollow sections conveniently house the electronic portions of the receiver and the batteries for the latter and provide suitable mounting surfaces for maintaining the speakers in the desired relative orientation; the tubular element permits a fully enclosed antenna assembly of unusual length for a portable receiver to extend between the sections for optimum sensitivity and minimization of directional effects upon reception from changes of orientation of the user.

8 Claims, 5 Drawing Figures

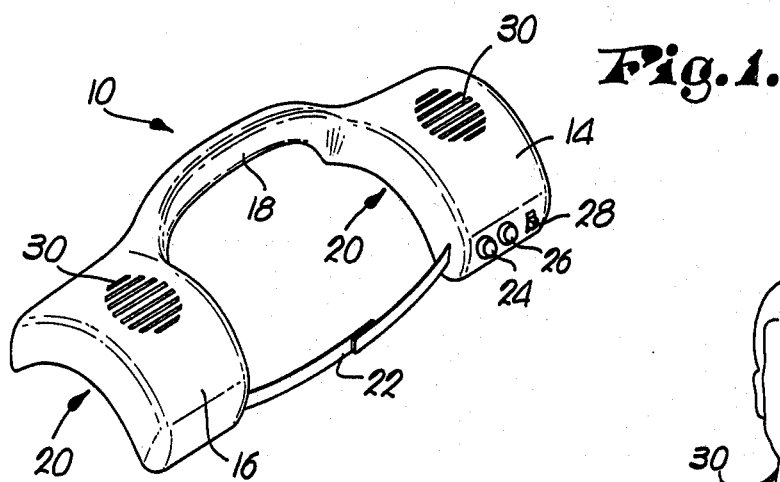
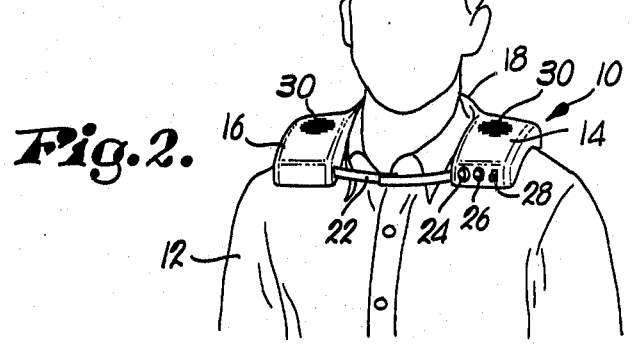
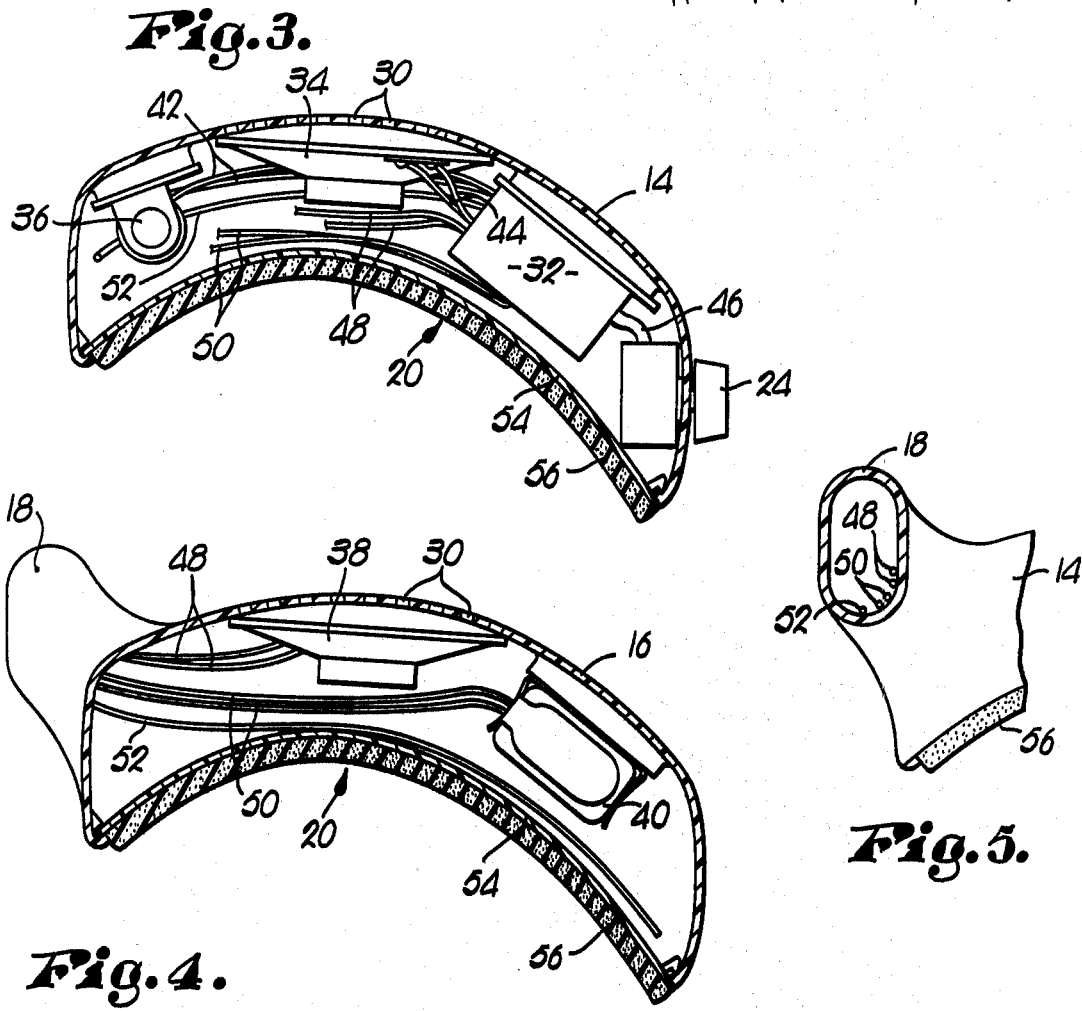
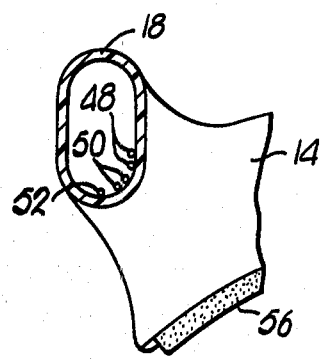

SHOULDER SUPPORTED STEREOPHONIC RADIO RECEIVER

BACKGROUND AND BRIEF DESCRIPTION OF THE INVENTION

This invention relates to portable radio receivers, especially of the stereophonic broadcast type, and deals more particularly with unique apparatus for housing and supporting such a radio receiver, the batteries for powering it, and the associated pair of spaced speakers, all upon the shoulders of a user thereof, and in such manner that the components are neatly enclosed while the speakers are oriented relative to each other and the ears of the user for optimum stereo-type reception.

Various types of apparatus have been devised in the past for mounting radio equipment on various parts of the user's anatomy, in order to avoid the need to hand-carry the same. Prior art typified by U.S. Pat. Nos. 3,114,105 and 2,571,514 has suggested mounting a single loudspeaker and a microphone in a single or dual assemblies secureable atop a user's shoulders and electrically interconnected with radio and battery equipment separately carried on a lower area of the body of the user by means of belts or straps. Another known technique used in the past for radio voice communication has involved a small radio receiver and one or more earphones within a football-type helmet. Similarly, miniaturized radio receivers have been integrally mounted within the structure of ordinary headset-type earphones. Each of these prior art devices, however, has been less than wholly satisfactory in one or more ways. For example, mounting of loudspeakers and receiver components on different parts of the body is rather cumbersome and presents obvious inconvenience for the user, as well as having not, to my knowledge, been heretofore extended to provide stereo-type reception. On the other hand, supporting a receiver and associated earphones on the head of the user usually results in fatigue or discomfort for the user after a relatively short period of use, as well as interfering with his ability to hear sounds from other sources such as someone addressing him. In any event, none of the known prior art apparatus has provided or suggested means for positioning a loudspeaker adjacent each ear of the user to achieve stereophonic sound effect and semiprivate listening while neatly enclosing and comfortably mounting such speakers and all of the associated radio and powering equipment on the user's shoulders by means of unitary apparatus that may essentially be "worn as a garment", without the need for harnesses, tight binding straps or the like.

It is, therefore, an important object of the invention to provide apparatus for mounting all of the component parts of portable stereophonic radio receiving equipment within a unitary assembly to be carried upon the shoulders of a user thereof.

Another object of the invention is to provide apparatus of the type described above in which the loudspeakers are automatically oriented relative to each other and to the ears of a user having his head in its normal position, to provide true stereophonic reception.

A still further object of the invention is to provide apparatus of the type described above which permits semi-private radio listening by the user yet which allows the user to discern sounds directed to him from other sources or surrounding environmental background sounds of which he would desire to remain aware.

Another object of the invention is to provide shoulder supported radio receiver apparatus which includes an internally communicating space of unusual length and width for a portable radio receiver for receiving and enclosing a two dimensional antenna, such as a bent dipole, for minimizing antenna directivity while improving the sensitivity and reliability of signal reception.

DETAILED DESCRIPTION OF THE INVENTION

In the accompanying drawing which forms a part of the specification and is to be read in conjunction therewith, and in which like reference numerals are employed to indicate like parts in various views:

FIG. 1 is a perspective view of my currently preferred embodiment of the invention taken from above, to the front and to one side thereof;

FIG. 2 is a perspective view of the invention on a smaller scale than FIG. 1 and showing its operative position upon the shoulders of a user;

FIG. 3 is a cross-sectional view taken on a front-to-rear plane through the enclosure section at one side of the invention looking to the user's left and showing certain internal assemblies in elevation;

FIG. 4 is a cross-sectional view, similar to FIG. 3, but taken through the enclosure section at the other side of the invention, looking to the user's right; and FIG. 5 is a fragmentary, cross-sectional view similar to FIGS. 3 and 4, but taken through the tubular element which structurally connects the enclosure sections.

DETAILED DESCRIPTION OF THE INVENTION

Turning attention first to FIGS. 1 and 2, a shoulder supported stereophonic radio receiver assembly broadly designated by the numeral 10 is adapted to rest upon the shoulders of a user 12 for portable carrying thereof. Enclosure and supporting means for the receiver 10 comprises a unitary, general U-shaped yoke structure having a bight and a pair of sides, which sides include essentially identical enclosure sections indicated by the numerals 14 and 16 respectively. Enclosure sections 14 and 16 are held in fixed, spaced apart relationship to each other by the tubular element 18, which extends therebetween and joins each of the sections near the rear of each of the latter. Each of the enclosure sections 14 and 16 include open or hollow interior portions to provide a housing for mounting components of the radio receiver including at least one loudspeaker therewithin. Enclosure sections 14 and 16 extend laterally across the crest of the user's shoulders and are spaced apart a distance such that the interior opposing sides thereof are disposed adjacent the sides of the user's neck. The lower surface 20 of each of the enclosure sections 14 and 16 is of essentially concave shape generally conforming to the rounded front-to-back contour of the user's shoulders, thus such enclosure sections extend transversely, forwardly and rearwardly in overlaying contact with each of the user's shoulders. The rather broad, contoured surface 20 inherently distributes the weight of the receiver 10 over a substantial area of the user's shoulders to provide wearing comfort. The structure presenting the interconnected sections 14 and 16 and intermediate element 18, which is essentially unitary and substantially rigid after assembly thereof with the other components of the device installed therein, may be constructed of various materials, although my preference is that such structure be formed from appropriate complemental housing-forming parts molded from a plastic material and then secured together in any suitable fashion.

The upper surfaces of the enclosure sections 14 and 16 possess a transverse curvature similar to the lower surfaces thereof, although the shape and configuration of such upper surfaces is not particularly significant to the invention. The aforementioned upper and lower surfaces are connected by lateral sidewalls to form generally rectangular box-like members. As shown in FIG. 2, the enclosure sections 14 and 16 rest upon the crest of the shoulders of the user 12, and are securely supported thereon by virtue of the fact that the curved lower surface portions of the enclosure sections contact not only the crest of the user's shoulders but also abut the extreme upper portions of the user's chest and back; tubular element 18 holds the enclosure sections in fixed relationship to each other and further functions to prevent such sections from falling forwardly off the user's shoulders; and, a releasable holding means in the nature of a fastening strap 22 having the opposite ends thereof secured to the forward portions of the enclosure sections 14 and 16 may be used to prevent the sections from falling rearwardly off the user's shoulders, but is optional and unneeded except for very active users.

Appropriate controls such as an on/off volume control 24, tuning control 26 and AM/FM switch 28 are conveniently disposed on the upper surface of the enclosure section 14, near the front of the latter to allow easy access thereto by the user 12, and each of the enclosure sections is provided with perforations 30 in the upper surface thereof, near the crest of the user's shoulders proximal to the user's ears to permit sound waves emanating from a later discussed loudspeaker within each of such enclosure sections to reach the ears of the user 12.

Referring now also to FIGS. 3, 4 and 5, the radio receiver depicted herein is of the AM/FM stereo type and includes standard component parts, which parts are housed within the enclosure sections 14 and 16. As shown in FIG. 3, enclosure section 14 has mounted within the cavity thereof: receiver circuitry 32 which is preferably of the miniaturized solid state type; high fidelity loudspeaker 34; and, an AM antenna 36 of the ordinary coil wound ferrite type. Enclosure 16 has mounted therewithin on the upper surface thereof, loudspeaker 38 and a power source in the nature of a battery and associated holding assembly 40. Loudspeakers 34 and 38 are each mounted with their respective sound radiating axis directed through the perforations 30 generally upward, toward the respective corresponding ears of the user 12. Receiver circuitry 32 is operably coupled with the AM antenna 36 via leads 42; with speaker 34 by leads 44; and with user controls such as on/off volume control 24, via lead 46. The receiver circuitry 32 is further connected to speaker 38 and battery assembly 40 via leads 48 and 50 respectively, which leads extend from the receiver circuitry 32 in enclosure section 14 to enclosure section 16 via the open interior of tubular element 18 which is in communication with the open interior portions of each enclosure section and therefore forms a conduit between such sections.

It is apparent that the unique one-piece, hollow unitary construction of the support structure allows the various components of the radio receiver to be placed in either enclosure section 14 or 16 while the necessary lead interconnections may be trained through the interior of tubular element 18 whereby to completely contain and thereby protect all of the various components within the single support structure. It will be appreciated that the various aforementioned components may be mounted at numerous convenient locations within the enclosure sections 14 and 16, and the particular arrangement disclosed herein merely illustrates one possible configuration. It is significant, however, that the various components may be judiciously placed within the respective enclosure sections to establish a balance between the latter, and thus evenly distribute the weight of such components over each of the user's shoulders.

As is customary in the type of radio receiver employed herein, the FM portion of the receiver circuitry is provided with a second antenna 52. Antenna 52 is of a dipole type having the extremities thereof disposed within enclosure sections 14 and 16 within the intermediate essentially straight stretches thereof threaded through the interior of tubular element 18. Antenna 52 may be of the folded dipole type, however, by virtue of the transversely extending open interior portions of the enclosure sections 14 and 16, the ends of the antenna 52 may be bent forwardly approximately at a 90 degree angle with respect to said intermediate stretches thereof, whereby to form a bent-type dipole antenna. Those skilled in the art will appreciate that a bent dipole antenna is nearly omnidirectional in its signal receiving characteristics and thus is far more desirable for use than other types of antennas typically employed in prior art portable radios, which prior art devices are susceptible to variations in reception performance when the direction of the associated antenna is altered.

As shown in FIGS. 3 and 4, the lower curved surfaces of the enclosure sections 14 and 16 include a generally concave structural member 54, which member may be attached to the enclosure sections by any suitable means subsequent to assembly and mounting of the various radio receiver components within such enclosure sections. A thin pad of nonslip material such as a soft rubber or low density foam 20 extends over the entire lower surface area of the member 54 and is secured to the latter as by bonding, in order to cushion the load of the receiver 10 on the shoulders of the user 12 and to prevent the receiver from sliding about.

In use, the receiver 10 provides a novel means for allowing the user 12 to enjoy full dimensional stereophonic radio reception without the need for earphones. By virtue of the fact that speakers 34 and 38 are mounted adjacent to the respective ears of the user 12, the user 12 independently perceives the separate channel signals being reproduced by the corresponding speakers 34 and 38, yet he is free to move about in his activities while the speakers remain stationarily supported on his shoulders in proper placement to assure stereophonic effect at all times. It is further significant to note that, in contrast to earphone-type receivers, the user 12 remains cognizant of ambient background sounds while enjoying uninterrupted stereophonic radio reception.

It will be observed that my novel shoulder-supported stereophonic radio receiver not only provides for the reliable accomplishment of the objects of the invention, but does so in an especially simple and economical manner. It is recognized, of course, that those skilled in the art may make various modifications or additions to the preferred embodiment chosen to illustrate the invention herein without departing from the scope and essence of my contribution to the art. Accordingly, it is to be understood that the protection sought and to be afforded hereby should be deemed to extend to the subject matter claimed and all equivalents thereof fairly within the scope of the invention.

I claim:

1. In a portable radio receiver to be supported upon the shoulders of a user:

radio signal receiving means;

a pair of loudspeakers operably coupled with said receiving means; and supporting means comprising a generally U-shaped, yoke-like structure having a pair of spaced side sections interconnected by an intermediate element, said sections having lower surfaces configured to rest upon and generally conform to the contours of a user's shoulders, said element being configured to extend behind a user's neck, said structure being provided with internal chambers for housing said receiving means, said loudspeakers being supported by said structure on opposite sides of a user's head, with one loudspeaker carried by each section respectively, and with each loudspeaker having its respective field of primary sound radiation directed toward the normal sound sensing zone of the corresponding one of the user's ears.

2. The invention of claim 1, wherein said receiving means is of the stereophonic broadcast receiving type.

3. The invention of claim 1, wherein said sections and said element of said supporting means comprise a unitary, substantially rigid assembly.

4. The invention of claim 3, wherein said sections and said element are hollow and in communication with each other, said receiving means includes antenna means, and said antenna means extends from the interior of one of said sections through the interior of said element into the interior of the other of said sections.

5. The invention of claim 4, wherein said receiving means includes electronic apparatus disposed in the interior of said other section.

6. The invention of claim 5, wherein said electronic apparatus includes a frequency modulation stereophonic broadcast receiver unit, and said antenna means includes a folded dipole type antenna.

7. The invention of claim 1, wherein is provided a releasable auxiliary holding means for extending between said sections in front of a user's neck.

8. A self-contained, portable, stereophonic broadcast, radio receiver adapted to be supported upon the shoulders of a user comprising:

a generally U-shaped, unitary, substantially rigid, yoke-like, hollow structure having an intermediate tubular element configured to extend behind a user's neck and a pair of spaced, larger side sections configured to rest upon and be supported by the respective shoulders of a user and each having opening means in its upper side disposed adjacent and below the normal position of the respective corresponding ear of a user;

stereophonic radio broadcast receiving means including electronic apparatus, battery power source means electrically coupled with said apparatus, and antenna means electrically coupled with said apparatus, said battery means being housed within the interior of one of said sections, said apparatus being housed within the interior of the other of said sections, said antenna means extending from said one section through said intermediate element into said other section; and a loudspeaker for each of said sections respectively electrically coupled with said apparatus and mounted within the corresponding section with its respective field of primary sound radiation directed through said opening means of the corresponding section toward the normal sound sensing zone of the corresponding one of the user's ears.

* * * * *

Disclaimer

4,084,139.—*Eugene J. Jakobe*, Kansas City, Mo. SHOULDER SUPPORTED STEREOPHONIC RADIO RECEIVER. Patent dated Apr. 11, 1978. Disclaimer filed July 7, 1980, by the assignee, *William J. Hass.*
Hereby enters this disclaimer to claims 1, 2 and 7 of said patent.
[*Official Gazette August 26, 1980.*]